United States Patent
Maschek et al.

(10) Patent No.: US 6,237,948 B1
(45) Date of Patent: May 29, 2001

(54) INTELLIGENT RESTRAINING SYSTEM

(75) Inventors: Marko Maschek, Vaihingen/Enz; Bernhard Mattes, Sachsenheim, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/341,245
(22) PCT Filed: Oct. 13, 1997
(86) PCT No.: PCT/DE97/02300
§ 371 Date: Jul. 15, 1999
§ 102(e) Date: Jul. 15, 1999
(87) PCT Pub. No.: WO98/35859
PCT Pub. Date: Aug. 20, 1998

(30) Foreign Application Priority Data

Feb. 13, 1997 (DE) .............................................. 197 05 431

(51) Int. Cl.[7] .................................................... B60R 21/32
(52) U.S. Cl. ............................. 280/735; 280/736; 701/45
(58) Field of Search ................................. 280/730.1, 734, 280/735, 736, 742; 701/45

(56) References Cited

U.S. PATENT DOCUMENTS

| | | | |
|---|---|---|---|
| 3,603,535 | * 9/1971 | DePolo | 280/730.1 |
| 3,642,303 | * 2/1972 | Irish et al. | 280/730.1 |
| 4,178,016 | * 12/1979 | Andres et al. | 280/734 |
| 5,039,035 | * 8/1991 | Fitzpatrick | 280/730.1 X |
| 5,370,355 | * 12/1994 | Rembold et al. | |
| 5,820,032 | * 10/1998 | Reiter | |
| 5,947,514 | * 9/1999 | Keller et al. | 280/736 X |

FOREIGN PATENT DOCUMENTS

4231522 * 3/1994 (DE) .

OTHER PUBLICATIONS

Third International Symposium on Soficticated Car Occupant Safety Systems. "Airbag 2000", Karlsruhe, Germany, Nov. 26–27, 1996, pp. 16–1 Through 16–19.

* cited by examiner

Primary Examiner—Brian L. Johnson
Assistant Examiner—Bryan Fischmann
(74) Attorney, Agent, or Firm—Michael J. Striker

(57) ABSTRACT

An intelligent restraint system, which generates a variable, individual tripping characteristic for each of a plurality of restraint devices depending on the type and severity of the accident and on the seat occupation, has a central gas generator (1), whose firing is tripped by a central control unit (4). The gas generator (1) is connected to the restraint devices (10–25). Electrically controllable valves (31–44) are disposed in the gas supply lines to the restraint devices (10–25). The controlling of the valves is effected from the central control unit (4) via the bus system (45).

6 Claims, 2 Drawing Sheets

INTELLIGENT RESTRAINING SYSTEM

BACKGROUND OF THE INVENTION

The present invention relates to a restraining element, or restraint system, which has a plurality of restraint devices for vehicle passengers and is equipped with a central control unit that via a bus system controls the tripping of the restraint devices.

One such restraint system is described in the printed proceedings of the third International Symposium on Sophisticated Car Occupant Safety Systems, "Airbag 2000", Karlsruhe, Germany, Nov. 26–27, 1996, pages 16-1 through 16-19. As can be learned from this paper, there have already been frequent cases in which vehicle passengers have been even fatally injured by an inflated air bag. As a rule, this was due to the fact that the restraint systems used in the past have been very rigid in their tripping behavior and cannot react flexibly to different types of seat occupation and to various seat positions and passenger body sizes or weights. Professionals in the field have therefore proposed the introduction of so-called intelligent restraint systems, which make it possible for the restraint devices (such as air bags) not to be tripped with full force in every instance, but instead to be tripped with reduced force or in succession in multiple stages, depending on the severity of the accident and on the seat occupation. An intelligent restraint system of this kind should also be able to tell whether a particular type or severity of accident, or a particular kind of seat occupation (child seat), is involved in which tripping should be omitted entirely. An intelligent restraint system should also be capable, in multiple collisions, to react with multiple tripping of the various restraint devices.

In the literature cited above, it is proposed that given the many restraint devices built into vehicles in the future (air bags in the head, thorax and knee region for every vehicle passenger, and belt tighteners), all the restraint devices be triggered from a central control unit via a so-called "firing bus". Every restraint device is provided with a gas generator, which receives its firing information from the central control unit via the firing bus.

The object of the invention is to disclose a restraint system of the type defined at the outset which at the least possible expense enables very flexible triggering of each individual restraint device, so that depending on the type of accident, the severity of the accident, and the seat occupation (such as the passenger position and passenger weight), optimal protection for the passengers is assured.

SUMMARY OF THE INVENTION

This object is attained in that a central gas generator is present, whose firing is tripped by the central control unit. The gas generator is connected to the restraint devices via a gas line system. Electrically controllable valves are disposed in the gas supply lines to the restraint devices, and their control is effected from the central control unit via a bus system. Thus for each restraint device, an individual inflation characteristic (course over time of the gas pressure) can be achieved, yet this requires only a single central gas generator and a single control unit, which ascertains the inflation characteristic of each restraint device by taking the type and severity of the accident and the seat occupation into account.

The central control unit is connected to one or more acceleration sensors, precrash sensors, and/or rollover sensors and/or seat occupation sensors, so as to ascertain the kinetic behavior of the vehicle and/or the severity of the accident and/or the seat occupation in the vehicle, and from that to derive the inflation characteristics for the restraint devices.

The valves may for instance be magnet valves, of the kind used for fuel injection in internal combustion engines.

The central control unit monitors the gas pressure in the gas generator and also controls an overpressure valve on the gas generator.

The gas line system may have the structure of a star-shaped bus, whose branches each supply gas to respective groups of restraint devices, which are distributed in accordance with zones in the vehicle.

BRIEF DESCRIPTION OF THE DRAWING

The invention will now be described in further detail in terms of an exemplary embodiment shown in the drawing. Shown are.

DESCRIPTION OF THE PREFERRED EMBODIMENTS

Figure 1:
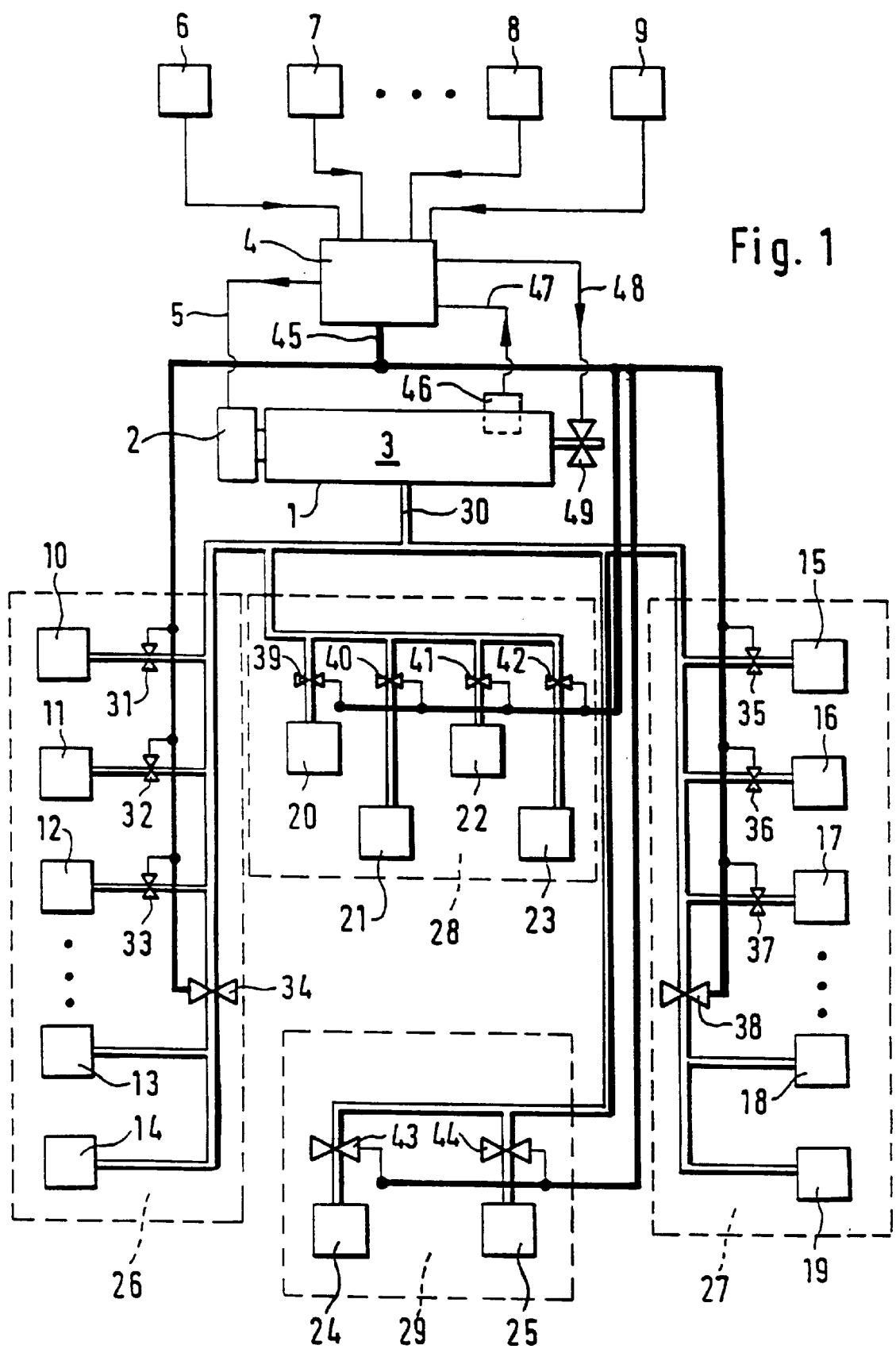
FIG. 1, a block circuit diagram of a restraint system according to the invention.

The intelligent restraint system shown in FIG. 1 has a central gas generator 1 with a pyrotechnical element 2 and a gas container 3. If the vehicle crash is occurring, the pyrotechnical element 2 receives firing information from a central control unit 4 via a line 5. The decision as to when the gas generator should be fired is made by the central control unit 4 on the basis of the output signals of a plurality of sensors 6, 7, 8, 9. These sensors 6–9 may be acceleration sensors, precrash sensors, rollover sensors, seat occupation sensors (including sensors that monitor the vehicle passenger compartment) or other sensors that ascertain the kinetic behavior of the vehicle and/or the severity of the accident. From all the sensor signals, the central control unit 4 derives decisions as to whether the severity of the accident necessitates tripping the safety system. Only then is a firing signal output to the pyrotechnical element 2 of the gas generator 1. The central control unit 4 also decides, on the basis of the sensor signals present, which ones of the restraint devices in the vehicle should be activated, and which inflation characteristic (course of the gas pressure distribution over time) is appropriate for each individual restraint device.

In FIG. 1, many restraint devices 10–25 are shown, of the kind that will be included in future safety systems in motor vehicles. The restraint devices are distributed in groups 26, 27, 28 and 29. Groups 26 includes restraint devices 10–14, which can be activated on the left side of the vehicle. This includes air bags in the head and thorax region and belt tighteners. The same is true for the restraint devices 15–19 combined in group 27 on the right side of the vehicle. The restraint devices 20–23 belonging to group 28 are a driver-side air bag, a passenger-side air bag, and knee bags for both sides. Finally, group 29 includes air bags 24 and 25 in the foot well region of the vehicle. These restraint devices just mentioned are intended only as examples. For the restraint system described, there may be fewer restraint devices, or more of them than noted here.

Each of the aforementioned restraint devices 10–25 is supplied from the gas container 3 via a gas line system 30 (shown in double lines in the drawing). The gas line system in the exemplary embodiment shown is embodied as a star-shaped bus, of which a different branch leads to each group 26, 27, 28, 29 of restraint devices. The gas line system may, however, be a tree-shaped or ring-shaped bus instead.

The delivery of gas to the individual restraint devices is controlled by means of electrically controllable valves 31–34, which are inserted into the gas supply lines to the restraint devices. To enable the gas pressure to be controlled individually for each restraint device 10–25, one valve in its gas line is assigned to each restraint device. However, it is equally possible for more than one restraint device to be controlled via a particular valve. FIG. 1 shows that the gas pressure in the restraint devices 13 and 14, for instance, is controlled jointly by the valve 34, while the gas pressure in the restraint devices 18 and 19 is controlled in the same way by the valve 38. The simultaneous triggering of more than one restraint device via one valve makes sense if experience shows that the passengers are offered optimal protection by the simultaneous inflation of multiple restraint devices with the same pressure. In the final analysis, this also makes for economy in terms of the number of valves.

Figure 2:
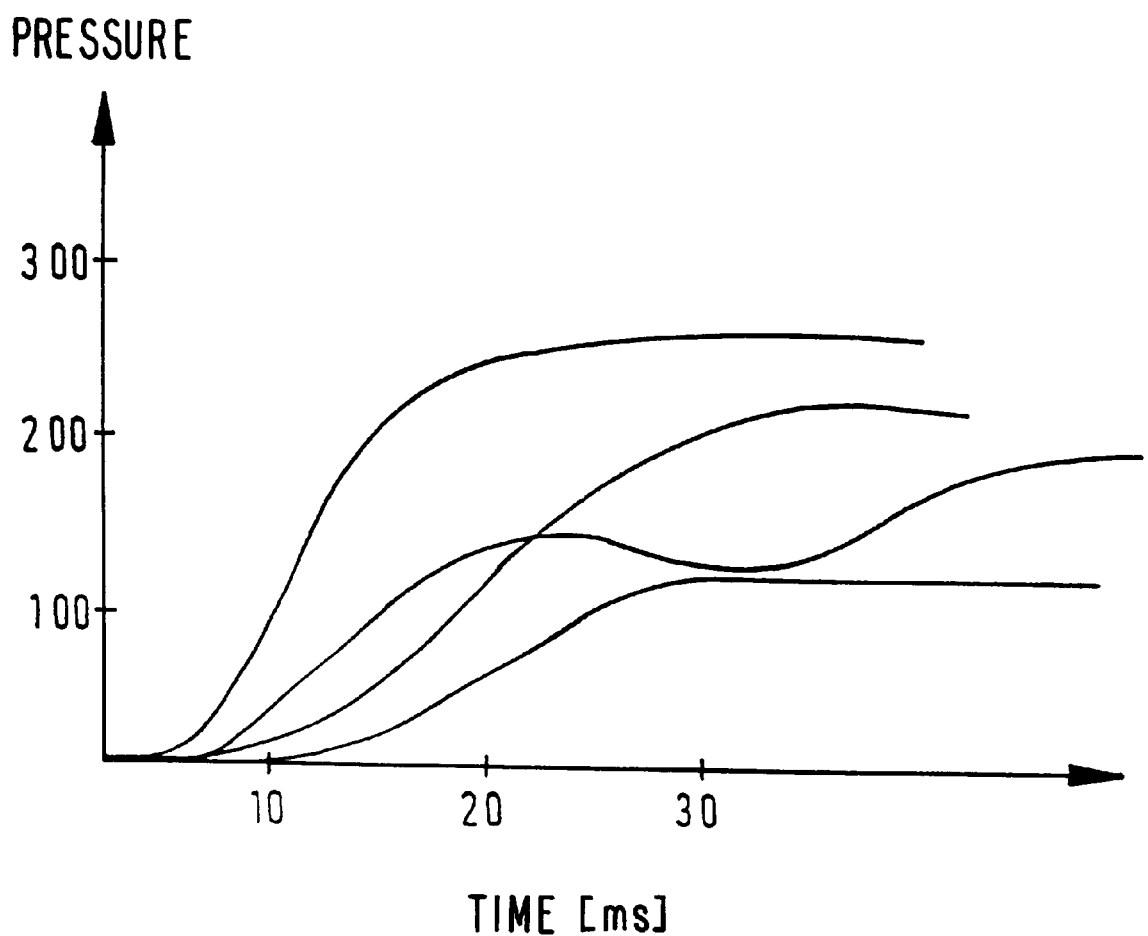
FIG. 2, a plurality of inflation characteristics.

From many crash texts, it is possible, on the basis of the sensed severity and type of accident and seat occupation in the vehicle, to derive for each restraint device 10–25 an optimal course of the gas pressure over time, or inflation characteristic, for passenger protection. In FIG. 2, a plurality of such inflation characteristics are shown as examples. They are expediently stored in memory in the central control unit 4, and the control unit 4 will control the pressure buildup in the various restraint devices 10–25 with the appropriate inflation characteristic via the valves 31–44, on the basis of the signals of the sensors 6, 7, 8, 9.

The triggering of the valves 31–44 is effected via a bus system (represented by heavy lines in FIG. 1). The bus system in FIG. 1 is a tree-shaped bus, from which a dedicated signal branch leads to each group 26, 27, 28, and 29 of restraint devices. This bus may also be star-shaped or ring-shaped. The valves 31–44 are preferably electrically controllable magnet valves. Such magnet valves are also used for fuel injection in internal combustion engines. This type of valves is distinguished by a linear characteristic of the valve stroke over time and operates with very little time lag, because the needle mass is so slight. Since in gasoline injection approximately the same pressures are employed as with the restraint devices, it becomes an option to use the same known magnet valves for the controlled supply of gas to the restraint devices as well.

On the gas container 3, a pressure sensor 46 is provided, by which the central control unit 4 receives information over a line 47 about the instantaneous pressure in the gas container 3. This information about the pressure in the gas container 3 is important to the central control unit 4, because if one of the valves 31–44 opens, the pressure in the gas container 3 drops, and the pressure change has an effect on all the inflation characteristics of all the restraint devices. This means that it is indispensable to take the pressure in the gas container 3 into account in controlling the valves 31–44.

To enable each individual valve 31–44 to be triggered individually from the central control unit 4, as described above, the central control unit 4 must perform an addressing operation, and to that end each valve must also be equipped with an address code. The addressing and address codes will not be described in further detail here, because they are well known in bus systems.

The central control unit 4 also has an output line 48 to an overpressure valve 49 on the gas container 3. After an accident, the central control unit 4 can open the overpressure valve 49, in order to dissipate the residual pressure in the gas container 3. This is because unintentional firing of any residual gas still present presents a risk to both rescue workers and accident victims. But if the residual gas is allowed to escape as fast as possible via the overpressure valve 49, then this risk can be precluded.

In many accidents, multiple collisions occur. To keep the risk of injury to the passengers as slight as possible, a restraint system would accordingly have to be capable of tripping the restraint devices at least twice in succession. The gas generator 1 is therefore designed such that either the quantity of gas in the gas container 3 suffices to fill the restraint devices 10–25 with gas twice or more in succession, or that repeated firing of the gas generator 1 can be done by the pyrotechnical element 2.

The restraint system described above could also be used to adapt the vehicle body rigidity to its crash partner. That is, the stiffness of the body is increased or decreased at the time of impact. For instance, if a precrash sensor system recognizes a small car as the weaker crash partner, then the body can be weakened by breaking reinforcement elements at defined points. The forces required for such breakage can be brought to bear by means of suitably high gas pressure. Conversely, the stabilizing elements can be left as is, if the precrash sensor system detects a stronger crash partner. Pedestrian protection can also be achieved by means of external air bags or a hood over the engine compartment that opens partway. On striking a pedestrian, the hood is pressed downward, thus absorbing energy.

What is claimed is:

1. A restraint system, comprising a plurality of restraint devices for vehicle passengers a central control unit that via a bus system controls the tripping of the restraint devices; a central gas generator (1) the firing of which is tripped by the central control unit (4); the gas generator (1) being connected to the restraint devices (10–25) via a gas line system (30); electrically controllable valves (31–44) disposed in the gas supply lines to the restrain devices (10–25); controlling of the valves being effected from the central control unit (4) via the bus system (45); the central control unit (4) monitoring the gas pressure in the gas generator (1A) and taking the gas pressure into account in triggering the valves (31–44).

2. The restraint system of claim 1, wherein the central control unit (4) controls each valve (31–44) in such a way that at the restraint system or restraint systems (10–25) subjected to gas via the valve (31–44), a course of the gas pressure over time occurs such that optimal protection for the passengers is assured on the basis of sensed data regarding at least one parameter selected from the group consisting of the kinetic behavior of the vehicle, the severity of the accident, the seat occupation, the passenger position and the passenger weight.

3. The restraint system of claim 1, wherein the central control unit (4) is connected to one or more acceleration sensors selected from the group consisting of precrash sensors, rollover sensors and seat occupation sensors (6–9).

4. The restraint system of claim 1, wherein the valves (31–44) are magnet valves, of the kind used for fuel injection in internal combustion engines.

5. A restraint system, comprising a plurality of restraint devices for vehicle passengers; a central control unit that via a bus system controls the tripping of the restraint devices; a central gas generator (1) the firing of which is tripped by the central control unit (4); the gas generator (1) being connected to the restraint devices (10–25) via a gas line system (30); electrically controllable valves (31–44) disposed in the gas supply lines to the restrain devices (10–25); controlling of the valves being effected from the central control unit (4) via the bus system (45), the central control unit (4) controlling an overpressure valve (49) on the gas generator (1).

6. A restraint system, comprising a plurality of restraint devices for vehicle passengers; a central control unit that via a bus system controls the tripping of the restraint devices; a central gas generator (1) the firing of which is tripped by the central control unit (4); the gas generator (1) being connected to the restraint devices (10–25) via a gas line system (30); electrically controllable valves (31–44) disposed in the gas supply lines to the restrain devices (10–25); controlling of the valves being effected from the central control unit (4) via the bus system (45), the gas line system (3) having the structure of a star-shaped bus with branches each supplying gas to respective groups (26, 27, 28, 29) of restraint devices (10–25), which are distributed in accordance with zones in the vehicle.

* * * * *